Jan. 16, 1934. E. F. KING 1,943,918
TRACTION DEVICE FOR VEHICLE TIRES AND METHOD OF MANUFACTURE
Filed Feb. 14, 1931 4 Sheets-Sheet 1
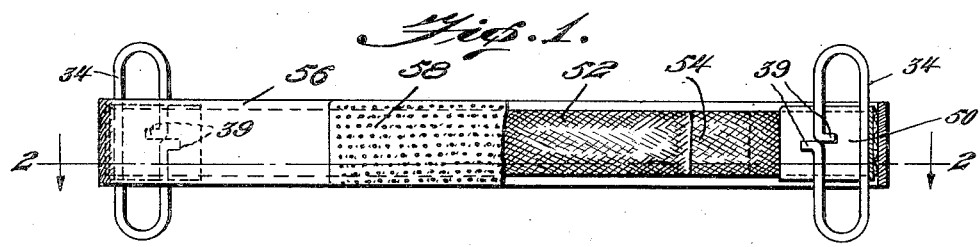
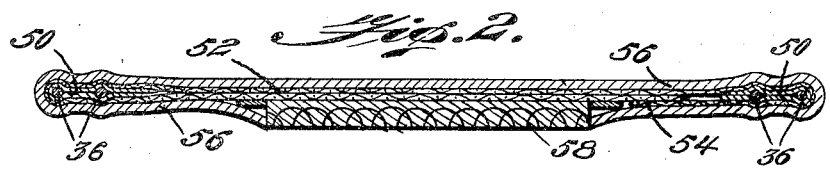
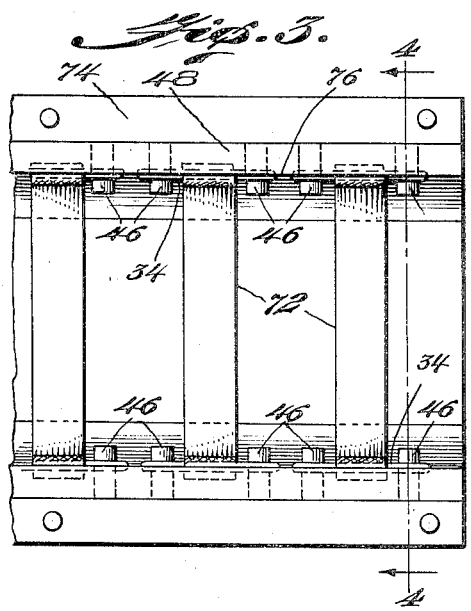
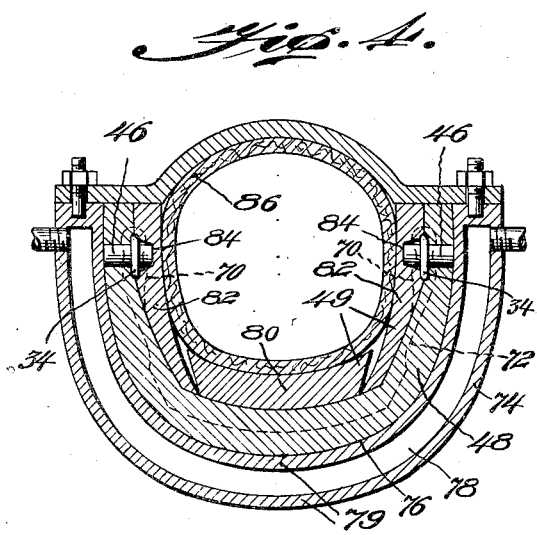
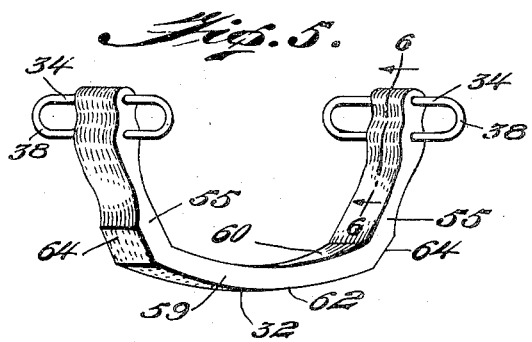
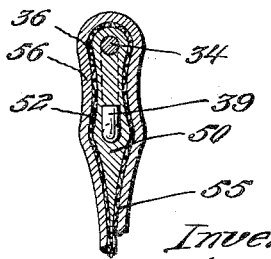
Inventor
Edward F. King
By Thomas A. Jenkes
Attorney

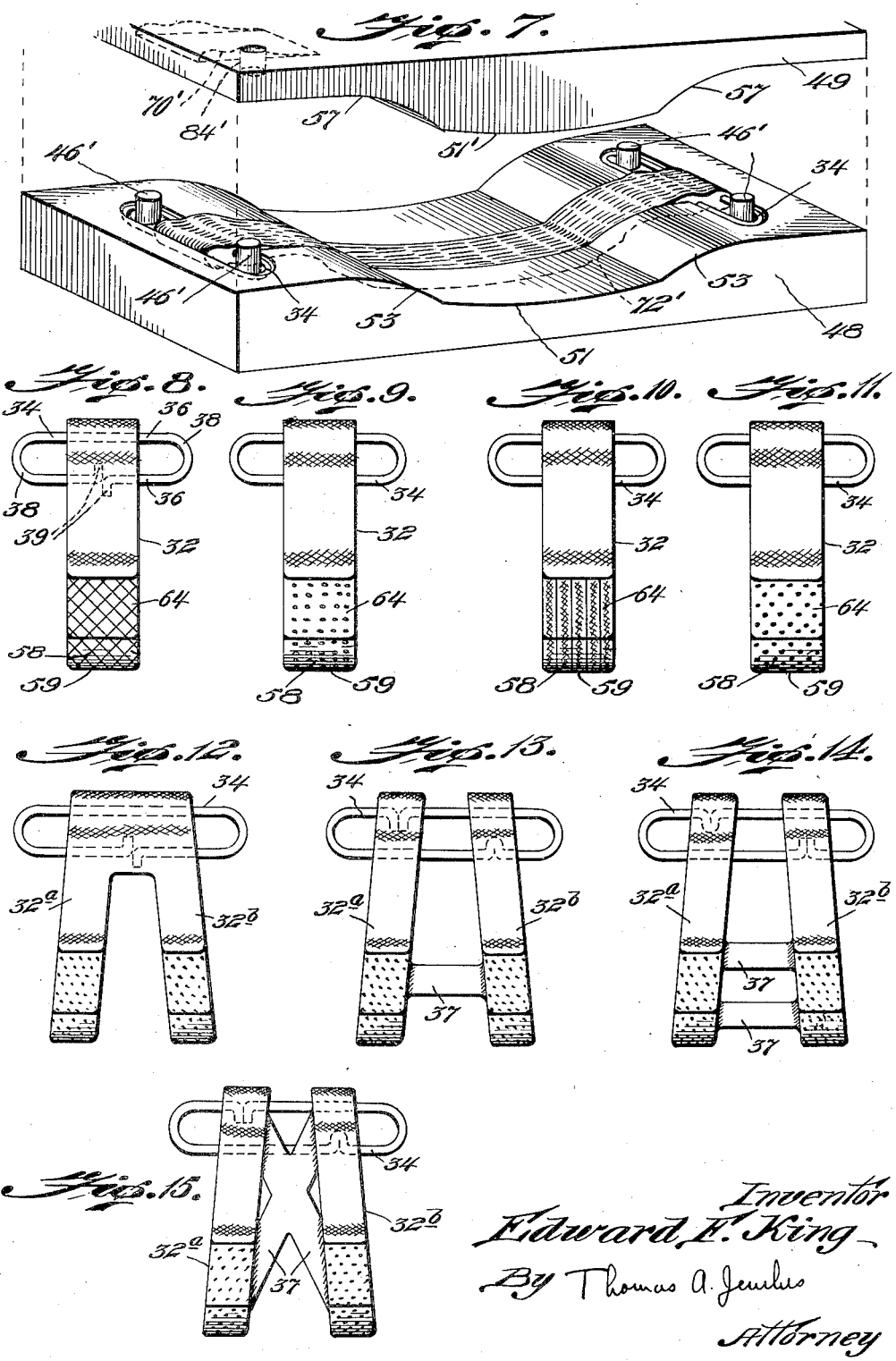

Jan. 16, 1934.  E. F. KING  1,943,918
TRACTION DEVICE FOR VEHICLE TIRES AND METHOD OF MANUFACTURE
Filed Feb. 14, 1931  4 Sheets-Sheet 3
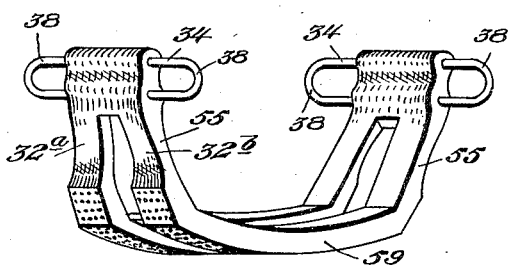
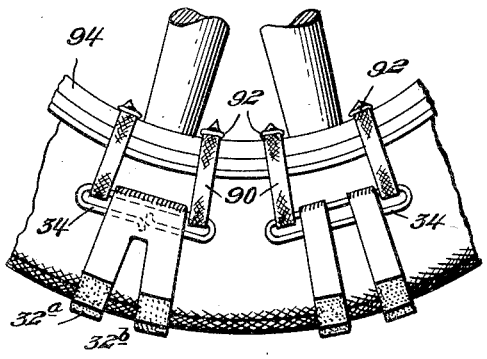
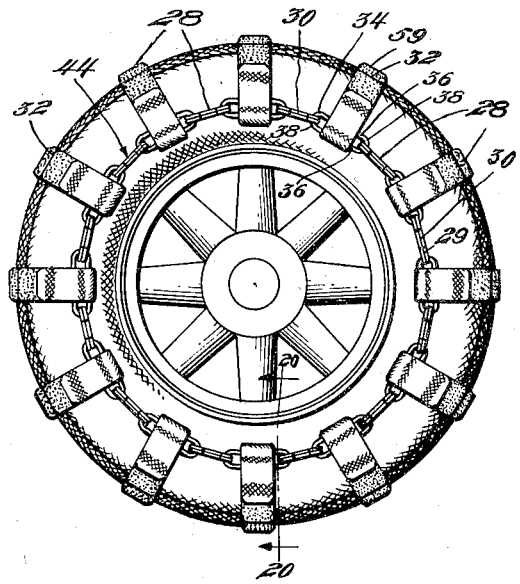
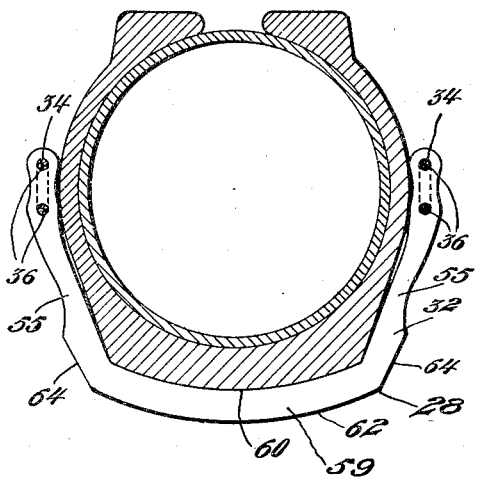
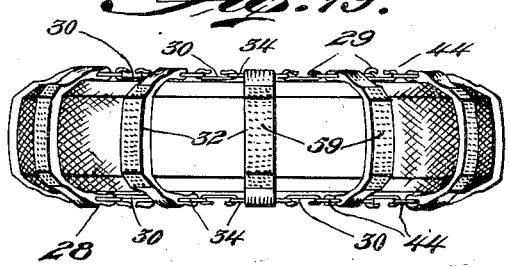
Inventor
Edward F. King
By Thomas A. Jenkins
Attorney Jan. 16, 1934.  E. F. KING  1,943,918
TRACTION DEVICE FOR VEHICLE TIRES AND METHOD OF MANUFACTURE
Filed Feb. 14, 1931   4 Sheets-Sheet 4
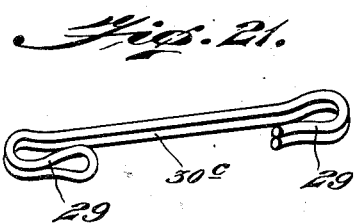
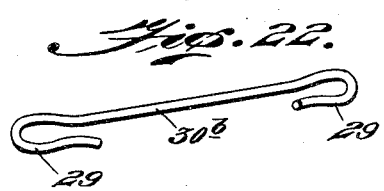
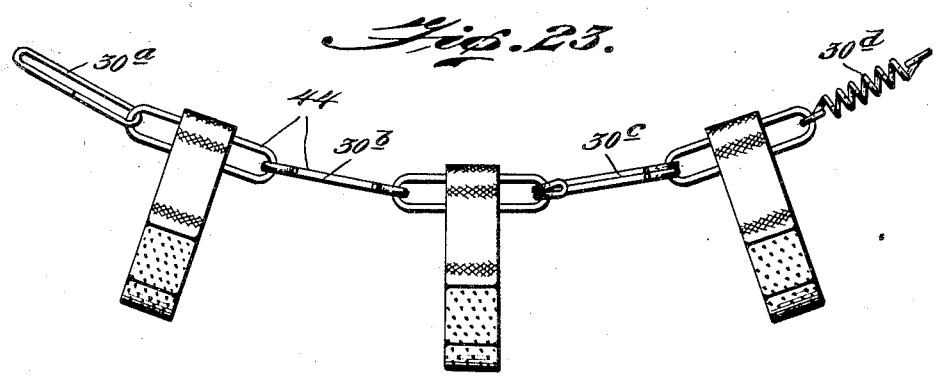
Inventor
Edward F. King
By Thomas A. Jenkins
Attorney Patented Jan. 16, 1934

1,943,918

UNITED STATES PATENT OFFICE 1,943,918

TRACTION DEVICE FOR VEHICLE TIRES
AND METHOD OF MANUFACTURE

Edward F. King, Cranston, R. I.

Application February 14, 1931. Serial No. 515,812

16 Claims. (Cl. 154—2)

My invention relates to traction devices for vehicle tires and includes what I believe is a novel method as well as a novel apparatus for their manufacture.

In the prior art where an additional traction is needed on the vehicle tire or for anti-skid purposes, such as in snow or wet weather, it has been the custom to use so-called tire chains, which consist of a plurality of tire chains extending one on each side of the tire and a plurality of equally spaced cross chains to form the traction and anti-skid surface over the tread surface of the tire. I am aware that others have attempted to make the cross strap members of flexible material, such as rubber so that they will not wear out quickly, but insofar as I am aware none on the market today have been what is called a marked commercial success, and an object of my invention is to provide a device of this description having spaced flexible cross straps of a type which is cheaper to make, lighter, which eliminates all waste material, employs less stock and for various reasons has greater traction power than any hitherto provided in such a manner to make these types of devices really practical.

In my improved embodiment I mold these cross strap members out of flexible material and I provide the links preferably of oblong shape having each side thereof firmly embedded at right angles through the ends of said cross straps to form projecting link ends near each side of each end thereof and I thus provide members connecting the link ends together to form with said links the continuous tire side chains. As I provide these link members with ends projecting at right angles through the ends of the cross strap members and links connecting these respective links together I thus am enabled to provide a cross strap member having links integral therewith which links of themselves go to make up the tire side chains. The members I employ to join said link ends together, preferably comprise detachable links and I believe I am the first therefore to provide units for making up a device of this description comprising only detachable link members and cross strap members having link ends projecting at right angles from near each end thereof, and I thus by the assembly of my separate elements am enabled to make up not only complete tire side chains on each side of the tire, but also to provide a device of a plurality of preferably equally spaced cross strap members of flexible material, thus made up entirely of units which may be readily sold as individual units, such as by the lower priced department stores, or by any dealer as replacements. Inasmuch as the units of my improved chain are preferably detachable it is obvious that they can be readily put on by the user without the great amount of trouble necessary to put on present day type of chains.

Further features of my invention while advantageous to the novel combination I provide relate specifically to the inherent structure of the cross strap members themselves which make these results possible and further features of my invention relate to the improvements of the cross strap members themselves. As stated, I preferably provide links having ends projecting at right angles from each side of the cross strap members near each end thereof. Inasmuch as these links are firmly embedded into the ends of the strap members on each side thereof it is obvious that they are firmly affixed to the ends of the strap members at two points thereby adding rigidity to the links and strength to the ends of the strap members and making the links substantially integral with the strap members. The strap members themselves preferably include a layer of flat fabric more than double the desired length of the cross straps wrapped around both links and doubled on itself to form the cross strap base. To more firmly secure the links to each end of the finished cross strap member I provide a layer of material which is cementitious when plasticized preferably of tough rubber wrapped around one or both of the side walls of each link member to act as a hard binding medium to firmly adhere the surface of the fabric base to the links or to form a firm block of material completely enclosing the links. The cross strap is also provided with a covering layer of plasticizable flexible material extending over said fabric layer which may have the outer tread surface thereof suitably roughened to form a traction surface. In my preferred embodiment, however, I preferably form the traction surface from a block of plasticizable flexible traction material preferably of a slighter greater length than the tire tread laid centrally over one side of said doubled fabric layer and I extend the covering layer of plasticizable flexible material so that the ends of the relatively thinner layer thereof will touch opposite ends of said traction block. The traction block may consist of a block of plain rubber, but preferably consists of rubber having anti-skid material embedded therein and preferably is constructed in accordance with the disclosure of my patents No. 1,464,715, issued Aug. 14, 1923 for Fabric and method of making same and 1,746,948, issued Feb. 11, 1930 for Fabric and method of making the same, which just as when formed by a tread surface of the tire, has the same advantages in the cross strap, namely of providing a tread surface having anti-friction material embedded therein which will remain until the cross strap is practically worn through and which presents the same appearance of wear when new as when worn.

When the various parts of my improved cross strap have been assembled in the manner aforesaid and the link ends firmly retained in the mould to remain in such a position during the plasticizing and molding operations, the material is then suitably plasticized and molded together in such a manner as to have the fabric layer lie flat. The cross strap is shaped to form an arcuate surface to cover the tire tread and side walls projecting downwardly therefrom having one or both sides of the links firmly embedded therethrough. Inasmuch as the cross straps are preferably shaped to form a tread surface compactly overlying that of the tire tread and side walls projecting therefrom, it is apparent that the tread surface of the cross strap will compactly fit over the tire surface, thus making the cross strap fashioned to the tire surface with an arcuate portion therein substantially conforming to the tire tread surface so that when it is merely laid on the tire surface, it will readily compactly conform thereto, thus expediting the attachment of an individual cross strap for the reason that the cross strap itself substantially exactly conforms to the tread and tire surfaces and may be readily laid thereon without stretching it to make it conform to the tire surface as is necessary with wire or other type of rubber cross straps and thus providing a structure wherein an individual link or the entire traction device may be readily mounted on a vehicle wheel by merely attaching the separate members thereof together and without deflation of the tire or the long period of stretching necessary in attachment of both rubber and chain types of traction devices today.

A further feature of my invention relates to the fact that I preferably provide the traction block of such a length, and shape the tread surface in such a manner that a portion of the traction block containing preferably anti-friction material will extend for a distance down each side wall of each cross link to form side traction surfaces.

A further advantage of my invention is to further strengthen the points of attachment of the links to the ends of the cross strap by forming the links of wire and providing portions extending at right angles to the sides thereof preferably in opposite directions to more firmly lock the links from a turning movement.

In order to more firmly retain the cross strap tautly over the tire surface and to the side tire chains made up as heretofore described, I preferably provide the ends of the detachable connecting links of a size to compactly fit in and fill the link ends projecting from each side of the ends of the cross strap to prevent displacement of the cross strap away from the side chains compactly fitting each side of the tire and thus insuring that the cross straps will compactly conform to and lie adjacent the tire surface at all times in use.

Further features of my invention relate to the improved method I employ of manufacturing the cross straps. As I provide individual cross straps each with a tread surface or base and with side walls projecting therefrom it is apparent that in the molding of each individual cross strap they will be molded along the line greater than the distance between the ends thereof and if the cross straps are formed around links or other holding devices firmly retained in position during the molding operation, it is apparent that during the molding operation the overlapping ends of the flat fabric base would be stretched relatively to each other to provide in the finished article a taut flat fabric base, thereby providing a stronger and better structure than where the fabric base is allowed to become loose during the molding operation and this novel result is achieved by the method of holding the links or ends of the cross straps so as to stretch the fabric or cause the overlapping ends thereof to move relative to each other to extend the links and the fabric base while the entire device is being molded along a broken line a greater distance between the points at which the ends of the strap are held.

Further features of my invention relate to the specific construction of molds I employ which are particularly adapted for this purpose, particularly to the novel type of expansible male member mold I preferably employ.

These and such other objects of my invention as may hereinafter appear will be best understood from a description of various embodiments thereof such as are shown in the accompanying drawings.

In the drawings, Fig. 1 is a plan view partially broken away showing how the various component parts of my improved cross strap are placed together prior to vulcanization.

Fig. 2 is a longitudinal sectional view thereof taken along the line 2—2 of Fig. 1.

Fig. 3 is a plan view of the mold I preferably employ for forming my improved cross strap, the top, expansible bag and male members thereof having been removed, showing the strap member portions in position prior to the molding operation.

Fig. 4 is a vertical sectional view taken along the line 4—4 of Fig. 3 showing the device in the act of molding a strap with the expansible male members, expansible bag and cover therefor attached.

Fig. 5 is a perspective view of my improved fashioned finished cross strap.

Fig. 6 is a sectional view taken along the line 6—6 of Fig. 5 showing the end of a completed cross strap.

Fig. 7 is a disassembled perspective view of an alternative type of mold I may employ.

Figs. 8–15 are end elevations of different types of cross straps which may be made in accordance with my invention, Fig. 8 showing a cross strap constructed with a rubber traction surface suitably roughened on the tread thereof, Fig. 9 showing my preferred type of cross strap employing a traction block of rubber and cotton constructed in accordance with my Patent No. 1,746,948, aforesaid, Fig. 10 showing a cross strap having a traction block constructed of rubber and fabric in accordance with my Patent No. 1,464,715, Fig. 11 showing an embodiment of my invention constructed with a block formed of rubber with a mixed cotton and wire traction surface constructed in accordance with my Patent No. 1,746,948 and Figs. 12–15 showing different types of so called double cross straps having either an enlarged common end or doubled end through which a single link projects at right angles thereto and showing how the structure may be reinforced near the end thereof by bending the ends of the wire in various manners of which the links are formed.

Fig. 16 is a perspective view of a so-called double type of strap constructed in accordance with the teachings of my invention.

Fig. 17 is a side elevation of a portion of a tire having cross links constructed in accordance with my invention individually attached by straps over the wheel felly to show an alternative method of binding the cross straps to the tire than the connecting links for the projecting link ends.

Fig. 18 is a side elevation of an automobile tire having the preferred embodiment of my invention attached thereto consisting of my improved type of so called single strap cross straps detachably secured together around the tire by detachable links to form the complete anti-traction device attached around the tire.

Fig. 19 is a plan view of an automobile tire with the improved embodiment of my traction device attached thereto shown in Fig. 18.

Fig. 20 is a cross sectional view along the line 20—20 of Fig. 18.

Fig. 21 is a perspective view of the improved type of detachable connecting link I preferably employ.

Fig. 22 is a perspective view of an alternative form thereof.

Fig. 23 is a diagrammatic side elevation showing different types of connecting links which may be employed to detachably or otherwise secure the projecting ends of the links near the end of each cross strap together to form my improved traction device.

In the drawings, wherein like characters of reference indicate like parts throughout, as shown in Figs. 18, 19 and 20, 28 generally indicates a traction device for vehicle tires constructed in accordance with my invention. This device includes a plurality of preferably equally spaced cross straps 32 of flexible material adapted to overlie and preferably shaped to conform to the tire surface and preferably oblong links 34 having each side 36 centrally embedded at right angles through the ends of said cross straps 32 to form the projecting link ends 38 and members 30 preferably detachably connecting the link ends 38 together to form with said links 34 the continuous tire side chains, whereby where the connecting members are detachable the individual cross strap members may be readily substituted in said device without deflation of the tire. The ends of the detachable members 30 are preferably provided with hooks 29 or other ends completely filling the link ends 38 to prevent displacement of the ends of said cross strap from said tire side chains 44. It is thus obvious that I have provided a novel type of traction device composed of a plurality of two units, namely the cross straps 32 with the attached links 34 having the ends 38 projecting integrally at right angles outwardly from near each end thereof and the preferably detachable connecting members 30 and due to the fact that the cross straps 32 are preferably shaped to overlie and to conform to the tire surface a device which may be in its entirety attached or an indvidual cross strap member thereof or connection link 30 thereof replaced without deflation of the tire. It is also obvious that while the links 34 may be pivotally attached to the ends of the strap 32 I preferably firmly embed each side 36 thereof within the ends of said cross strap to provide rigid points of connection for said cross straps 32 to said connection members 30 and a construction in which the links 34 will not swivel at their points of connection to the strap end 32.

My invention in addition particularly relates to the inherent construction of the cross strap members themselves and the method of and apparatus for their manufacture. Broadly speaking my improved strap member 32 comprises a member of flexible material adapted to overlie the tire surface and links 34 connected to the ends thereof preferably having ends 38 projecting at right angles from each side thereof near each end of the strap members.

Perhaps the inherent construction of my improved strap members may be best understood from a description of their method of manufacture which I will describe in detail as certain features of my invention relate not only to the method of manufacture of the straps but to an inherent novel feature in the manufacture of any similar type of article, and also to the novel type of apparatus I preferably employ for this purpose. My improved cross strap includes the link members 34 preferably of oblong shape. As diagrammatically illustrated in Figs. 1 and 2 and as shown in Figs. 3, 4 and 7 respectively the link members 34 are preferably spaced from each other the desired amount for said flexible member to extend over said tire surface with the desired degree of curvature and in my preferred embodiment are thus mounted so as to be held during the molding operation on the pins 46 projecting from the female mold members 48. In order to firmly embed the link members 34 within the ends of said strap 32 I preferably cover the sides of each individual link member with a layer of material 50 which is cementitious when plasticized wrapped around one or preferably both side walls 36 of each link member 34. While any type of suitable material may be employed I preferably employ for this purpose where the flexible covering layer consists of rubber a tough harder rubber, particularly designed to firmly secure the ends of the strap around the side walls of the link members.

A further feature of my invention relates to the improved construction of oblong wire link members 34 themselves which are constructed into the flat parallel sides 36 and being preferably formed from wire may be provided with wire ends 39 projecting at right angles from one or both of the side walls thereof. As shown in Fig. 8 the ends 39 are preferably located in the upper side wall of each link and project in opposite directions. The links if desired as shown in Fig. 8 may be soldered together adjacent said projecting ends 39 or said projecting ends may consist of suitable lugs or other devices soldered or otherwise secured thereto. The oblong link members are then arranged in spaced relationship by mounting them on the pins 46 and where the side walls 36 having bent wire ends 39 are employed are preferably arranged as shown in Fig. 8. The improved body portion of my cross strap preferably consists of a flat layer 50 preferably constructed of a textile fabric and which is wrapped around the side walls 36 and harder rubber covering 50 of both links and doubled over on itself, preferably so that one end 54 thereof will overlap the opposite end thereof to form at this point a triple thickness of fabric in the fabric layer 52 so that said overlapping end 54 may be stretched over the end below it in the process of manufacture. It is thus apparent that said fabric layer 52 will join said links together and form a cross strap base. I then suitably wrap a covering layer of plasticizable flexible material 56 over said fabric layer 52. In my preferred embodiment said flexible layer preferably comprises rubber although it is obvious that any type of rubber, rubber latex, synthetic rubber, any suitable modified resin, rosin, phenol condensation product or suitable synthetic product may be employed for this purpose which may be suitably plasticized and shaped into the desired shape. In forming my improved cross strap it is desirable as in tires to provide a relatively tougher traction surface and for this purpose I preferably lay a block 58 of flexible traction material of slightly greater length than the tire tread centrally over one side of said fabric layer 52 and wrap the covering layer 56 from each end of said traction block 58 over the balance of said fabric layer 52. This traction block may consist also of any suitable material of the same general type of flexible covering which may be plasticized and shaped and bonded to the fabric layer, but in my preferred embodiment preferably consists of rubber. In my preferred embodiment I preferably provide a traction block with some type of anti-skid material, such as fabric, wire etc., and I preferably construct it in accordance with the disclosure of my aforesaid Patents Nos. 1,464,715 and 1,746,948. I then subject said thus formed layers to heat and pressure to render the plasticizable surfaces of said plasticizable materials plastic to bond said surfaces to said fabric layer and set them around said links and simultaneously mold said flexible plasticized strap by subjecting the surfaces of said strap to pressure along the broken line greater than the distance between the links 34, while retaining the links 34 in fixed position on the pins 46 or other suitable holding means to maintain the fabric layer 52 in a flat taut position to form a cross strap having a mixed fabric and plasticized body extending preferably beyond said links firmly bonded to a side wall of said links, preferably both side walls thereof and having upper and lower surfaces 60 and 62 respectively, bent to substantially the curvature of the tire tread in use with outer ends or side walls 55 projecting angularly from the molded base 59 thereof. It is apparent that when the articles are molded along the broken line greater than the distance between the firmly retained links or ends thereof that the fabric layer 52 will be extended to at all times hold it in a taut position centrally of said mold, the overlapping end 54 then an underlying end sliding over the opposite end underneath to provide the necessary give and that when improved cross strap member is allowed to set the fabric layer 52 will be in a stretched flat position, a feature not always possible in previous types of construction. I preferably provide the traction block 58 of such a length and the molds of such a shape that in the finished article shown the traction block will extend a distance as at 64 down each side wall 55 along each side wall thereof adjacent the tread surface base 59 to form a side traction surface for use particularly in deep snow or otherwise. It is apparent that if desired one side wall 36 only of the links 34 may be secured within the ends of said strap 32 and that the use of the projections 39, although desirable is optional. If, however, both side walls 36 of the links are embedded in the ends of the strap 32 and the projections 39 are employed, it is apparent that a much stronger structure will be provided, which will not pivot and which will resist radial tangential and other types of thrusts in use on the cross straps 32.

While my improved cross straps may be thus made according to the methods heretofore described in any suitable manner, I have shown in the drawings two different types of molds particularly adapted for this purpose and which if desired may be used for molding similar types of articles. Both of these types of molds whether they be of the novel type of expansible male member mold shown in Figs. 3 and 4 or the more or less common type of flat mold shown in Fig. 7 include cooperating male and female mold members 49 and 48 respectively having cavities 70 and 72 therein respectively of the desired shape of said strap and means such as the pins 46 on said mold members to hold the cross strap link ends stationary during the molding operation, said mold members 48 and 49 and respective cavities being shaped to mold said strap or article along a broken line of greater length than the distance between said link holding means 46 in accordance with my improved method heretofore described. I believe I am the first therefore to provide means to hold the ends of a cross strap or similar article to hold the fabric body portion 52 thereof taut during the molding operation so that the plasticizable material will fit around the fabric body thereof when said fabric body is in a taut flat position.

Figs. 3 and 4 show my improved type of mold for this purpose. Said mold includes a body portion 74 having an arcuate cavity 76 therein preferably a partially cylindrical cavity 76 as shown in Fig. 3. A steam jacket 78 is preferably contained in the wall 79 thereof. A detachable female mold member 48 of the desired configuration of the strap or other article having the desired cavities 72 for a plurality of straps therein shown in Fig. 3 may be placed within the cavity 76, or if desired a plurality of female mold members employing single cavities 72 may be employed. As stated, the cavities 72 in the female member form in combination with the cavities 70 in the male members conjoint cavities of the substantial size of the strap or other article. As the means to hold the link ends in my improved strap or the ends of the article I preferably provide the two sets of two spaced link receiving pins 46 projecting radially inwardly at diametric points from near the upper ends of each wall thereof each set being spaced a distance apart more than the width of the strap and located just exterior of the cavity 72 adapted to hold the link ends 38 firmly during the molding operation. In my preferred embodiment shown in Fig. 4 I provide a radially expansible male mold member 49, which comprises the wedge shape tread surface forming base 80 and the radially expansible strap side wall forming members 82, said members 82 having cooperating holes 84 therein to receive the sets of pins 46 from said female mold member and having cavities 70 therein of a suitable shape on expansion of said male member 49 against the female mold member 48 to form the strap within the cooperating concavities 70 and 72 and I provide means such as the expansible bag 86 to abut said base 80 and side wall forming members 82 to force the material into the respective cavities 70 and 72 to form the strap from the plastic material, the shape of said mold members and cavities being such as to form a strap tread portion 59 shaped and bent to compactly cover the entire tread and side walls 55 projecting angularly therefrom, the portion 59 being formed by the coaction of the male member base 80 against the lower surface of the female member and the side walls suitably shaped by the radially outward expansion of said side wall forming members 82. The expansible element 86 comprises an expansible bag which if desired may also be suitably filled with steam or hot air to provide heat during the molding operation. It is thus apparent that the flat surfaces of the male members 80 and 82 will be radially pressed outwards to abut the flat surfaces of the female mold member 48 exterior of the respective cavities 70 and 72 therein to entirely compress the plastic material within the cavities. In the actual molding operation, the mold is so heated as to not only render the surfaces of the plasticizable material plastic to cause them to stick to the fabric layer 52, but inasmuch as the fabric layer is flexible to render the plasticizable material so plastic that it may be readily shaped in the molding operation to the desired curvature. It is obvious that after the various male members are forced home against the female member that the steam may be turned off the desired amount of time for the cross strap or other articles to be set before removal of the male members and the strap from the mold and that the fabric portion 52 is held in an extended position during both the molding and setting operations so that when the plastic material is set around said flat fabric base 52 it will be in a flat taut position held during the molding and setting operation by the pins 46 centrally of the plastic material so that during the setting operation it will set centrally thereof.

I have shown in Fig. 7 a slightly different form of apparatus which may be employed for molding my improved cross strap, said mold being a modification of the well known type of flat mold. In this embodiment the female mold member 48 is provided with a central surface 51 shaped to the desired degree of curvature of the tire tread and upwardly curved end portions 53, and spaced receiving pins 46' projecting upwardly from said curved portions adjacent the ends thereof. I also provide a complementary shaped male member 49 having a portion 51' shaped to cooperate with said portion 51 in said female member and curved portions 57 projecting upwardly therefrom shaped to cooperate with the curved portions 53 in the female member. Both said male and female mold members are provided with cooperating plastic material receiving cavities 70' and 72' respectively shaped to form a cross strap and said male member may be provided with cooperating holes 84' therein adapted to receive the ends of the pin 46' therein, said pins and holes being spaced respectively from each other on opposite sides of the cavity in each end wall thereof. It is thus apparent that as the male member is brought forcibly against the female member the material in the base thereof will be forced upwardly of the curved side walls in the respective cavities to mold the plastic material in the respective cavities to the desired shape and also that in this embodiment as the link ends 38 and strap ends are firmly held on the pins 46' that the fabric strip 52 will be held in a taut yet expansible position during the molding operation and retained in a taut flat position during the setting operation so as to provide the same end result in the finished product heretofore described.

I have also shown in the drawings different embodiments of my invention, Figs. 8 to 15 representing end elevations of different specific types of cross strap members I may employ. The embodiment shown in Fig. 8 is preferably constructed with a plain rubber traction block having the tread surface suitably roughened and as shown the inner link wall 36 is provided with the oppositely disposed projections 39 therein. In Fig. 9 I have shown a traction block constructed of rubber in accordance with the construction of my Patent No. 1,464,715. In Fig. 11 I have shown a traction block constructed of rubber and cotton and with non-skid projections constructed in accordance with my Patent No. 1,746,948. In Figs. 12–15 I have shown various types of cross straps constructed in accordance with my invention constructed of relatively wide cross straps with the center portions thereof molded or cut away to form two straps projecting over the tire surface each having ends secured in the desired fashion to the links 34. Fig. 12 is generally similar to the construction in Fig. 8 with the center portion thereof merely being removed. Figs. 13, 14 and 15 show such a construction consisting of two individual strap ends 32$^a$ and 32$^b$, each having the ends thereof suitably attached to the respective links 34 so that the ends 38 will project therefrom at substantially right angles thereto and having binder straps 37 joining said cross straps 32$^a$ and 32$^b$ together. In Fig. 13 I have shown two binder straps 37 joining said strap members 32$^a$ and 32$^b$ together. In Fig. 14 I have shown sets of binder straps 37 and in Fig. 15 I have shown two binder straps 37 crossing each other and joining said cross straps 32$^a$ and 32$^b$ together at angles to each other. Fig. 16 is a perspective view of such a so-called doubled type of strap shown in Fig. 12.

It is obvious that my invention relates chiefly to the construction of the cross strap which may consist of a single member 32, or two members 32$^a$ and 32$^b$ as shown. Instead, however, of joining the projecting link ends 38 together by means of the preferably detachable connecting links 30 I may attach individually the cross straps around the wheel felly by means of the straps 90 which may be individually provided with buckles 92 and which may have one end thereof attached around the projecting link ends 38 on one side of the tire go underneath the felly 94 and pass through the opposite respective projecting link ends 38 on the opposite side of the tire. It is obvious that two sets of straps are provided when the cross straps are attached to the tire in this manner, one each for the opposite respective link ends on each end of the links. It is apparent that with this construction continuous side chains will not be formed on each side of the tire, but each cross strap will be individually secured to the tire around the felly. With this type of construction it is clearly obvious that it may be attached without even jacking up the car. Instead of providing a plurality of these devices to continuously go around the tire in case an automobile should be stuck in the snow or mud, one only may be sufficient to be temporarily secured thereto to remove it from said obstruction. It is apparent that the connecting links 30 may be permanently attached to each respective link end 38 in any desired manner. They may consist as shown in Fig. 23 of a standard link 30$^a$ which is adapted to be permanently secured to each opposite respective link end 38 or they may consist of the detachable link 30$^b$ shown in perspective in Fig. 22 and also in Fig. 23 consisting of a single strand of wire having each respective end thereof inwardly hooked as at 29. For purposes of strength however, where a detachable link member is desired I preferably construct my link members as shown in Fig. 21 as 30ᵇ comprising a double fold of wire so constructed that each respective fold thereof will be adjacent and provided with the respective hooks 29 at each end thereof. This type of hook is also shown in 30ᶜ in Fig. 23. I may if desired provide a spring such as the hook 30ᵈ shown in Fig. 23 which may be permanently or detachably secured to each respective link end. Where the hook members 30 are constructed of wire it is apparent that the hook portions thereof may be bent so that they may be readily resiliently bent under pressure to admit the projecting link end and again bent to retain the link members 30 within said projecting link ends 38 as usual. It is thus apparent that I have provided not only a novel type of traction or antiskid device for use in tires, a novel type of cross strap adapted to be used therewith in any of the various forms shown or any desired modification thereof within the scope of the claims and I have also provided a novel method and apparatus for molding and shaping flexible articles of this description during their manufacture.

It is understood that my invention is not limited to the specific embodiment shown or methods or apparatuses described and that various deviations may be made therefrom without departing from the spirit and scope of the appended claims.

What I claim is:

1. A traction device for vehicle tires, comprising a plurality of equally spaced cross strap members of flexible material adapted to overlie and shaped to conform to the tire surface and oblong links having each side thereof firmly embedded at right angles through the ends of said cross straps to form projecting link ends and members detachably connecting the link ends together to form with said links continuous tire side chains whereby individual cross strap members may be readily substituted in said device without deflation of said tire, said connecting members having ends completely filling the link ends to prevent displacement of the ends of said cross straps from said side chains.

2. A traction device for vehicle tires, comprising a plurality of spaced cross strap members of flexible material adapted to overlie the tire surface having links directly attached to each end thereof and members connecting the links together to form with said links continuous tire side chains.

3. A traction device for vehicle tires, comprising a plurality of spaced cross strap members of flexible material adapted to overlie the tire surface having links directly attached to each end thereof and members connecting the links together to form with said links continuous tire side chains, said connecting members having ends completely filling the link ends to prevent displacement of the ends of said cross straps from said side chains.

4. A traction device for vehicle tires, comprising a plurality of spaced cross strap members of flexible material adapted to overlie the tire surface and links having each side thereof firmly embedded at right angles through the ends of said cross straps to form projecting link ends and members connecting the link ends together to form with said links continuous tire side chains, said connecting members having ends completely filling the link ends to prevent displacement of the ends of said cross straps from said side chains.

5. A traction device for vehicle tires, comprising a plurality of spaced cross strap members of flexible material adapted to overlie the tire surface having links directly attached to each end thereof and members detachably connecting the links together to form with said links continuous tire side chains whereby individual cross strap members may be readily substituted in said device without deflation of said tire.

6. A traction device for vehicle tires, comprising a plurality of spaced cross strap members of flexible material adapted to overlie and shaped to conform to the tire surface and links having each side thereof firmly embedded at right angles through the ends of said cross straps to form projecting link ends and members detachably connecting the link ends together to form with said links continuous tire side chains whereby individual cross strap members may be readily substituted in said device without deflation of said tire.

7. A cross strap member for vehicle tires, comprising a member of flexible material adapted to overlie the tire surface, and links having ends projecting at right angles from each side thereof near each end thereof, comprising oblong link members spaced from each other the desired amount for said flexible member to extend over said tire surface, a layer of plasticized cementitious material around both side walls of each link member, a flat fabric layer more than double the desired length of said cross strap wrapped around both links and cementitious material and doubled on itself to form the cross strap base, a block of plasticized flexible traction material of a greater length than the tire tread extending centrally over said one side of said doubled fabric layer, and a covering layer of plasticized flexible material having the ends thereof touching said traction block and extending over said fabric layer, said layers being moulded together to have the fabric layer lie flat and shaped to form an arcuate surface to cover the tire tread and side walls projecting angularly therefrom having both sides of the link firmly embedded therethrough with the ends of said traction block extending a distance down each side wall to form side traction surfaces, said oblong link members having ends projecting at right angles in opposite directions from the upper side walls thereof to rigidly support each side wall.

8. A cross strap member for vehicle tires, comprising a member of flexible material adapted to overlie the tire surface, and links having the ends projecting at right angles from each side thereof near each end thereof, comprising oblong link members spaced from each other the desired amount for said flexible member to extend over said tire surface, a flat layer more than double the desired length of said cross strap wrapped around both links doubled on itself to form the cross strap base, and a covering layer of plasticized flexible material extending over said fabric layer, said layers being moulded together to make the fabric layer flat.

9. A cross strap member for vehicle tires, comprising a member of flexible material adapted to overlie the tire surface, and links firmly embedded in each end thereof, comprising link members spaced from each other the desired amount for said flexible member to extend over said tire surface, a layer of plasticized cementitious material around the side walls of each link member, a flat fabric layer more than double the desired length of said cross strap wrapped around both links and cementitious layers and doubled on itself to form the cross strap base, a block of plasticizable flexible traction material of a greater length than the tire tread laid centrally over said one side of said doubled fabric layer, and a covering layer of plasticized flexible material having the ends thereof touching said traction block and extending over said fabric layer, said layers being moulded together to have the fabric layer lie flat.

10. A cross strap member for vehicle tires, comprising a member of flexible material adapted to overlie the tire surface, and links firmly embedded in each end thereof, comprising link members spaced from each other the desired amount for said flexible member to extend over said tire surface, a flat layer more than double the desired length of said cross strap wrapped around both links and doubled on itself to form the cross strap base, and a covering layer of plasticized flexible material extending over said fabric layer, said layers being moulded together to have the fabric layer lie flat and shaped to form an arcuate surface to cover the tire tread and side walls projecting angularly therefrom.

11. A cross strap member for vehicle tires, comprising a member of flexible material adapted to overlie the tire surface and links having ends projecting at right angles from each side thereof near each end thereof, comprising oblong link members spaced from each other the desired amount for said flexible member to extend over said tire surface, a flat layer more than double the desired length of said cross strap wrapped around both links doubled on itself to form the cross strap base, and a covering of plasticized flexible material extending over said fabric layer, said layers being moulded together to have the fabric layer lie flat, said link members having ends projecting at right angles in opposite directions from the upper side walls thereof to rigidly support each side wall.

12. The method of making cross strap members for vehicle tires, which comprises forming oblong wire link members to have flat parallel sides and wire ends projecting at right angles in opposite directions in a side wall thereof, arranging said oblong link members in spaced relationship with the side walls having bent wire ends adjacent, wrapping a flat layer of material cementitious when plasticized over both side walls of said link members, wrapping a flat fabric layer around the side walls and covering of both links and doubling it on itself with an overlapping end to join said links together and to form a cross strap base, laying a block of flexible traction material of a slightly greater length than the tire tread centrally over one side of said fabric layer, and wrapping a covering layer of plasticizable flexible material from each end of said traction block over said fabric layer, and subjecting said thus formed layers to heat and pressure to render the plasticizable surfaces plastic to bond said surfaces to said fabric layer and set them around said links, and simultaneously moulding said flexible plasticized strap by subjecting the surfaces of said strap to pressure along a broken line greater than the distance between the links while retaining the links in fixed position, to maintain said fabric layer in a flat taut position to form a cross strap having a mixed fabric and plasticized body extending beyond said links firmly bonded around each side wall of both links and having upper and lower surfaces bent to substantially the curvature of tire tread and outer ends projecting angularly therefrom.

13. The method of making cross strap members for vehicle tires, which comprises forming oblong wire link members to have flat parallel sides and wire ends projecting at right angles in opposite directions in a side wall thereof, arranging said oblong link members in spaced relationship with the side walls having bent wire ends adjacent wrapping a flat fabric layer around the side walls of both links and doubling it on itself to join said links together and to form a cross strap base, and wrapping a covering layer of plasticizable flexible material over said fabric layer, and subjecting said thus formed layers to heat and pressure to render the plasticizable surfaces of said plasticizable materials plastic to bond said surfaces to said fabric layer and set them around said links.

14. The method of making cross strap members for vehicle tires, which comprises arranging link members in spaced relationship, wrapping a flat layer of material cementitious when plasticized over both side walls of said link members, wrapping a flat fabric layer around the side walls and covering of both links and doubling it on itself to join said links together and to form a cross strap base, laying a block of flexible traction material of a greater length than the tire tread centrally over one side of said fabric layer, and wrapping a covering layer of plasticizable flexible material from each end of said traction block over said fabric layer, and subjecting said thus formed layers to heat and pressure to render the plasticizable surfaces of said plasticizable materials plastic to bond said surfaces to said fabric layer and set them around said links.

15. The method of making cross strap members for vehicle tires, which comprises arranging said oblong link members in spaced relationship, wrapping a flat fabric layer around the side walls of both links and doubling it on itself with an overlapping end to join said links together and to form a cross strap base, and wrapping a covering layer of plasticizable flexible material and simultaneously moulding said flexible plasticized strap by subjecting the surfaces of said strap to pressure along a broken line greater than the distance between the links while retaining the links in fixed position, to maintain said fabric layer in a flat taut position to form a cross strap having a mixed fabric and plasticized body extending beyond said links firmly bonded around the side walls of links and having upper and lower surfaces bent to substantially the curvature of tire tread and outer ends projecting angularly therefrom.

16. A cross strap member for vehicle tires, comprising a member of flexible rubber material having a tread adapted to overlie the tire surface having fibre strands embedded therein and projecting radially therethrough at substantially evenly spaced intervals therein and terminating substantially at the outer surface thereof for non-skid purposes.

EDWARD F. KING.